United States Patent
Feero et al.

(10) Patent No.: US 12,487,927 B2
(45) Date of Patent: Dec. 2, 2025

(54) REMOTE CACHE INVALIDATION

(71) Applicant: Apple Inc., Cupertino, CA (US)

(72) Inventors: Brett S. Feero, Lake Oswego, OR (US); Dennis R. Bradford, Portland, OR (US); Gaurav Garg, San Jose, CA (US); Jeff Gonion, Campbell, CA (US); Bernard J. Semeria, Palo Alto, CA (US); James Vash, San Ramon, CA (US); Richard F. Russo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/582,305

(22) Filed: Feb. 20, 2024

(65) Prior Publication Data
US 2025/0103492 A1    Mar. 27, 2025

Related U.S. Application Data

(60) Provisional application No. 63/585,020, filed on Sep. 25, 2023.

(51) Int. Cl.
*G06F 12/0808* (2016.01)
*G06F 12/0882* (2016.01)
*G06F 12/1045* (2016.01)

(52) U.S. Cl.
CPC ...... *G06F 12/0808* (2013.01); *G06F 12/0882* (2013.01); *G06F 12/1045* (2013.01)

(58) Field of Classification Search
None
See application file for complete search history.

(56) References Cited

U.S. PATENT DOCUMENTS

| | | | |
|---|---|---|---|
| 5,752,264 A | 5/1998 | Blake et al. | |
| 9,218,289 B2 | 12/2015 | Rychlik et al. | |
| 9,836,411 B2 | 12/2017 | Gschwind | |
| 10,042,762 B2 | 8/2018 | Jayasena et al. | |
| 10,558,590 B2 | 2/2020 | Parker et al. | |

(Continued)

FOREIGN PATENT DOCUMENTS

| | | |
|---|---|---|
| CN | 112148424 A | 12/2020 |
| CN | 114721726 B | 8/2022 |

(Continued)

OTHER PUBLICATIONS

International Search Report and Written Opinion in PCT Appl. No. PCT/US2024/046009 mailed Dec. 19, 2024, 9 pages.

*Primary Examiner* — Yaima Rigol
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to performing remote cache invalidations. In some embodiments, primary processor circuitry is configured to, based on execution of a remote invalidate instruction (e.g., an ISA-defined instruction), send a cache invalidate command to coprocessor circuitry. The coprocessor circuitry includes coprocessor cache circuitry and cache invalidation control circuitry configured to, in response to the cache invalidate command sent by the primary processor, invalidate one or more cache lines in the coprocessor cache circuitry without executing any instructions on the coprocessor circuitry.

18 Claims, 10 Drawing Sheets

(56) References Cited

U.S. PATENT DOCUMENTS

| | | | |
|---|---|---|---|
| 10,915,466 B2 | 2/2021 | Hagersten et al. | |
| 11,327,890 B1 | 5/2022 | Mukherjee | |
| 11,681,531 B2 | 6/2023 | Burger et al. | |
| 11,782,849 B2 | 10/2023 | Rozas et al. | |
| 2004/0030843 A1 | 2/2004 | Arimilli et al. | |
| 2004/0088496 A1* | 5/2004 | Glasco | G06F 12/082 711/144 |
| 2007/0156972 A1 | 7/2007 | Uehara et al. | |
| 2008/0005794 A1 | 1/2008 | Inoue et al. | |
| 2009/0083496 A1* | 3/2009 | Stevens, Jr. | G06F 12/0808 711/E12.078 |
| 2011/0093646 A1 | 4/2011 | Koka et al. | |
| 2012/0089808 A1 | 4/2012 | Jang et al. | |
| 2012/0137079 A1 | 5/2012 | Ueda | |
| 2012/0216002 A1 | 8/2012 | Moyer et al. | |
| 2013/0262814 A1 | 10/2013 | Asaro et al. | |
| 2014/0156960 A1 | 6/2014 | Simoncelli | |
| 2018/0089094 A1* | 3/2018 | Clancy | G06F 12/1063 |
| 2018/0165215 A1 | 6/2018 | Kumar et al. | |
| 2020/0117609 A1 | 4/2020 | Finkbeiner et al. | |
| 2020/0142838 A1 | 5/2020 | Rozas et al. | |
| 2020/0264973 A1* | 8/2020 | Lee | G06F 13/1668 |
| 2020/0351370 A1 | 11/2020 | Radi et al. | |
| 2021/0149763 A1 | 5/2021 | Ranganathan et al. | |
| 2021/0200687 A1 | 7/2021 | Durham et al. | |
| 2022/0261351 A1 | 8/2022 | Vasudevan et al. | |

FOREIGN PATENT DOCUMENTS

| | | |
|---|---|---|
| CN | 114721722 B | 9/2022 |
| CN | 117472802 A | 1/2024 |
| DE | 112011103433 B4 | 10/2019 |
| TW | I653532 B | 3/2019 |

* cited by examiner

Example fields of remote invalidate instruction 180

Example fields of remote invalidate command 190

REMOTE CACHE INVALIDATION

PRIORITY CLAIM

The present application claims priority to U.S. Provisional App. No. 63/585,020, entitled "Remote Cache Invalidation," filed Sep. 25, 2023, the disclosure of which is incorporated by reference herein in its entirety.

BACKGROUND

Technical Field

This disclosure relates generally to computer processors, and, more specifically, to invalidation by a processor of data in a remote cache.

Description of the Related Art

Processors typically include caches that provide fast access to various data relative to external memory. For example, instruction caches and data caches may store information from external memory to avoid higher latency accesses to the external memory. As another example, translation lookaside buffers (TLBs) store translations of memory addresses from externally stored page tables to avoid higher-latency access to those translations.

One processor may cause invalidation of data in another processor's cache in various scenarios. For example, the processor may map pages used by the other processor in a virtual memory system. When the processor unmaps a page, the other processor may still have corresponding data in its cache that should be invalidated.

In typical processor implementations, coherence circuitry manages caches and ensures their contents are up to date with respect to memory and other data. For example, if a cache entry is written with new data, then coherence circuitry may invalidate the entry in other coherent caches. In some situations, however, a processor may unmap a page that was mapped for another processor with a cache that is not managed by coherence circuitry (e.g., a cache in a coprocessor).

DETAILED DESCRIPTION

Figure 1:
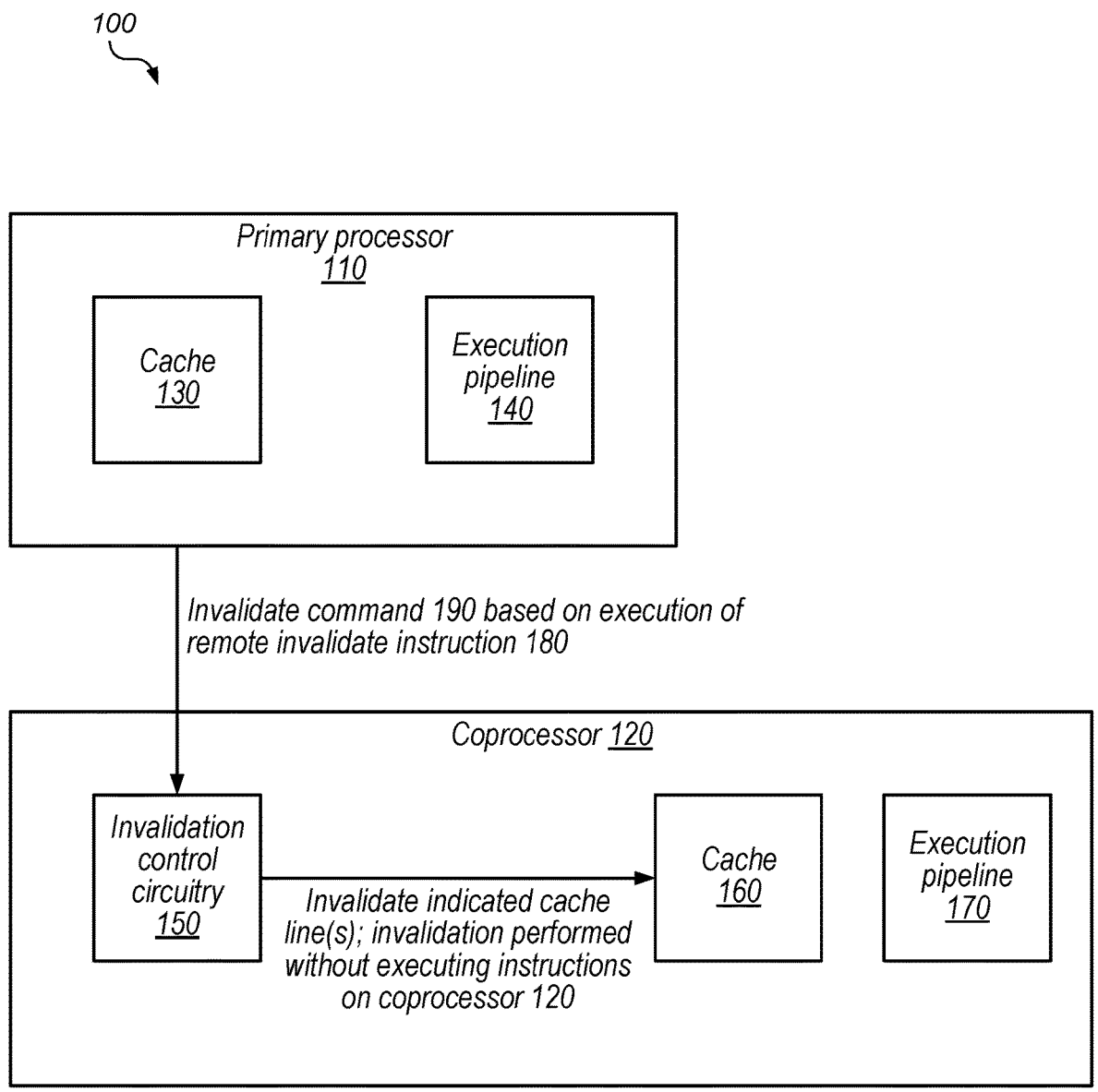
FIG. 1 is a block diagram illustrating an example primary processor configured to execute a remote invalidate instruction to cause an invalidation in a coprocessor cache, according to some embodiments.

In disclosed embodiments, a primary processor may, based on executing a remote invalidate instruction, remotely invalidate cache lines of a coprocessor cache in a secure and fine-grained manner. In particular, the invalidation may occur without executing instructions on the coprocessor, e.g., based on a bus command to invalidation control circuitry of the coprocessor.

In various implementations the coprocessor is not a peer to the primary processor in various aspects. As one example, coherency circuitry of the overall system may not manage coherency for one or more caches of the coprocessor. As another example, the coprocessor may operate outside of protection domains implemented by the primary processor (e.g., security rings, privilege levels, etc.). As yet another example, the coprocessor may operate outside of one or more shareability domains implemented by the primary processor (e.g., outer/inner cacheable/sharable domains in ARM® architectures).

In some cases, the primary processor may desire to invalidate one or more coprocessor cache lines in such a non-peer coprocessor. For example, when the primary processor unmaps a page table entry, it may determine to cause invalidation of cache lines in the coprocessor cache with addresses in the unmapped page. As noted above, the primary processor may execute a remote invalidation instruction to cause this invalidation, which may ensure that the coprocessor does not keep dirty data for an unmapped page in the coprocessor cache.

In some implementations, the processor may cause remote invalidation at coarse granularity (e.g., flushing the entire coprocessor cache). In some embodiments, in contrast, the remote cache invalidation may be performed at finer granularity, e.g., at cache line granularity, which may advantageously reduce interference with other cached data and thereby improve performance.

In some implementations, the processor may cause the coprocessor to perform software-based invalidation, e.g., using an inter-processor interrupt to trigger execution of instructions on the coprocessor to invalidate coprocessor cache lines. Software-based coprocessor cache invalidation, however, may present potential security and performance issues. For example, the coprocessor may not be included in one or more trusted security domains and therefore could theoretically be compromised and potentially keep dirty cache lines marked as valid in the coprocessor cache.

As will be discussed below, the coprocessor may include invalidation control circuitry configured to invalidate one or more coprocessor cache lines in response to an invalidate command sent by the processor in a way that is more secure and efficient than other approaches. The invalidation control circuitry may perform invalidations at cache-line granularity based on the command, without executing any instructions on the coprocessor to perform the invalidations (although the coprocessor may be executing other instructions for other operations during a time interval in which the invalidations occur). The primary processor may also trigger TLB invalidations (e.g., corresponding to an unmapped page for which cache lines are being invalidated) and issue synchronization commands (e.g., barriers).

FIG. 1 is a block diagram illustrating an example primary processor configured to execute a remote invalidate instruction to cause an invalidation in a coprocessor cache, according to some embodiments. In the illustrated example, system 100 includes primary processor circuitry 110 and coprocessor circuitry 120. Primary processor 110 includes cache circuitry 130 and execution pipeline circuitry 140. Coprocessor 120 includes invalidation control circuitry 150, cache circuitry 160, and execution pipeline circuitry 170. System 100 may be a System-on-Chip (SoC), for example.

Primary processor 110, in some embodiments, may include circuitry and/or microcode configured to perform various operations e.g., based on executing instructions of a program. As used herein, the term "instruction" is intended to broadly cover commands to a processor in a computer program, including without limitation: instruction set architecture (ISA)-defined instructions, interpreted instructions, compiled instructions, microcode, machine code, etc. Execution pipeline 140, in various embodiments, is configured to execute instructions (including the remote invalidate instruction discussed herein).

Coprocessor 120, in some embodiments, is configured to execute instructions using execution pipeline 170. Coprocessor 120 may be a firmware processor of an SoC, a graphics processor, an image processor, a display processor, etc. As discussed above, coprocessor 120 may not be a peer of primary processor 110 in various aspects.

Invalidation control circuitry 150, in some embodiments, is configured to receive invalidate command 190 and accordingly invalidate one or more cache lines of cache 160. As will be discussed in more detail with respect to FIGS. 4-5, invalidation control circuitry 150 may, depending on various fields of command 190, invalidate cache 160 at cache line granularity or multiple-cache-line granularity. As noted above, using invalidation control circuitry 150 may provide additional security, relative to implementations in which the invalidation is performed by software executing on execution pipeline 170, for example.

Cache circuitry 160, in some embodiments, is configured to store data for coprocessor 120. Cache 160 may store various types of data (e.g., an instruction cache that stores instructions, a data cache that stored data, etc.) from a higher-level cache or memory for reduced data access latency. Cache 160, in some embodiments, is included in a multi-level cache hierarchy. Therefore, coprocessor 120 may include one or more lower-level caches that are closer to execution pipeline 170 relative, one or more higher-level caches that are closer to system memory, or both.

As shown, processor 110 is configured to remotely invalidate data in cache 160. More specifically, processor 110 executes a remote invalidate instruction 180 using execution pipeline 140 and sends a cache invalidate command 190 to coprocessor 120 based on the execution, in some embodiments. The coprocessor 120 receives (e.g., via a fabric or bus) the remote invalidate command 190 from primary processor 110 and routes it to invalidation control circuitry. Invalidation control circuitry 150 then invalidates one or more cache lines in cache 160 based on invalidate command 190 without executing instructions on coprocessor 120.

As will be discussed with respect to FIGS. 4A-B, command 190 may further include data specifying the granularity and location of the invalidation, which may advantageously invalidate at cache line granularity, e.g., to avoiding flushing a larger portion of cache 160.

Figure 2:
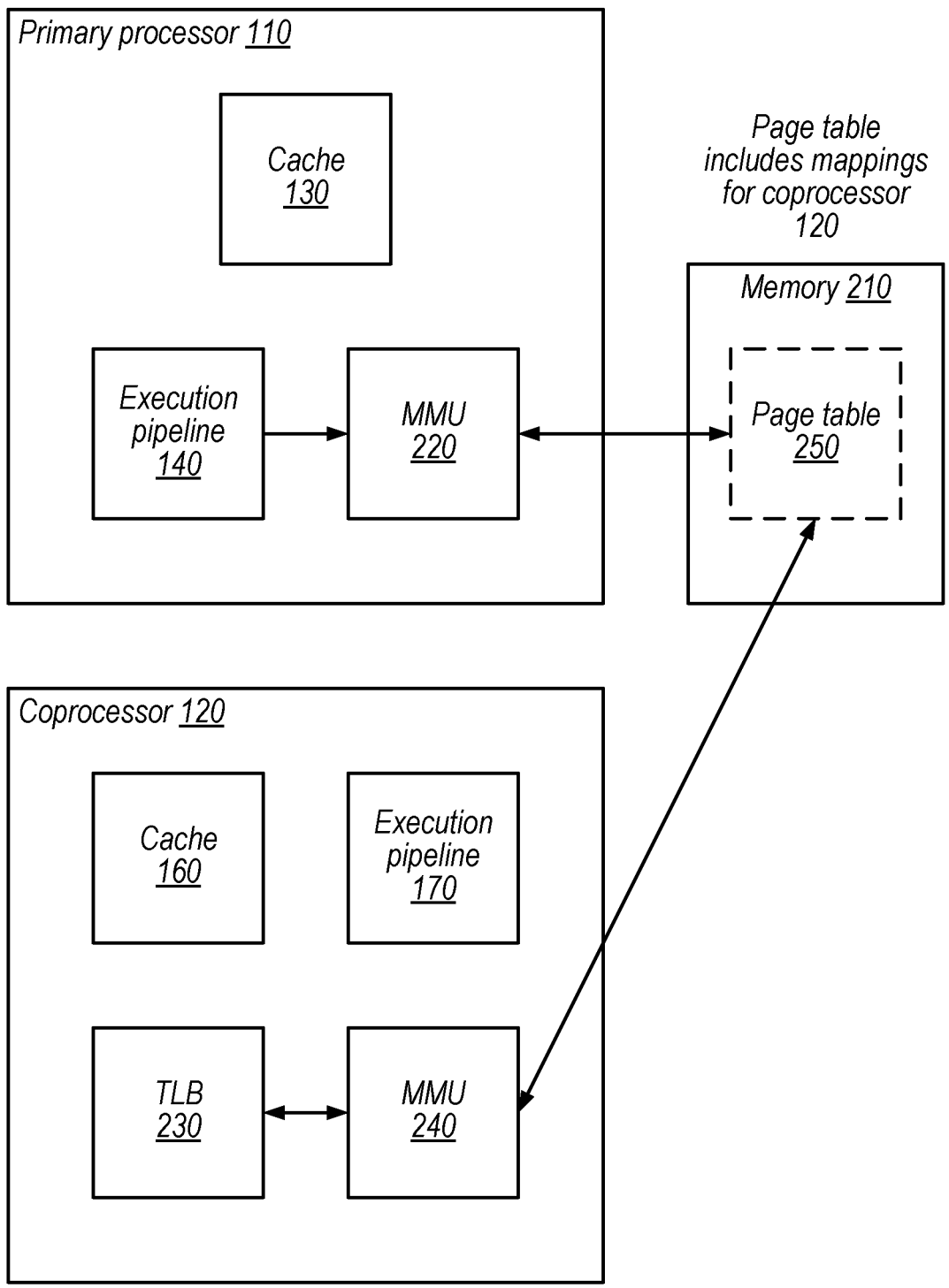
FIG. 2 is a block diagram illustrating an example primary processor configured to maintain a page table for a coprocessor, according to some embodiments.

FIG. 2 is a block diagram illustrating an example primary processor configured to maintain a page table for a coprocessor, according to some embodiments. As shown, primary processor 110 is configured to populate page table 250 with mappings, some of which are utilized by coprocessor 120. As will be discussed below, subsequent change in page table 250 may lead primary processor 110 to perform a remote cache invalidation on cache 160 of coprocessor 120. Note that while page unmappings are discussed herein as example triggers for remote cache invalidations, disclosed invalidation techniques are contemplated for invalidations based on various appropriate triggers.

Primary processor 110, in the illustrated example, is configured to create and populate page table 250 (here a software data structure, as indicated by the dashed lines) for coprocessor 120. As shown, MMU 220 is configured to, based on instructions executed by execution pipeline 140, generate translations e.g., from OS virtual addresses to physical addresses of a memory circuit (e.g., memory 210). MMU 220 is configured to store the generated translations in page table 250 for use by primary processor 110, coprocessor 120, or both. In some embodiments, maintenance of page table 250 is part of an operating system memory management procedure.

Primary processor 110 may, in some cases, create page table 250 on behalf of coprocessor 120 to enhance security, for example. Coprocessor 120 may have only read access (and not write access) to page table 250. Example techniques of a processor securely managing page tables for itself and other components, including coprocessors, can be found in U.S. application Ser. No. 16/564,502, entitled "Page Protection Layer," filed on Sep. 9, 2019.

In some cases, primary processor 110 may determine to unmap pages of page table 250 (e.g., to replace pages that have not been used recently to manage overall memory footprint). As discussed above processor 110 may perform remote validation of corresponding data in cache 160 in this context.

Coprocessor 120, in the illustrated embodiment, is configured to access translations from page table 250. As shown, coprocessor 120 may use MMU 240 to walk page table 250 and store resulting translations in TLB 230 e.g., to later access memory whose address translation is in page table 250. Note that because TLB 230 stores information related to page table 250, any modification at page table 250 (e.g., an unmap) may require a corresponding modification (e.g., an invalidate) at TLB 230, as will be discussed in more detail with respect to FIG. 6.

Note that caches 160 and 130 may in some cases be configured to cache data from the same memory space whose mappings are in shared page table 250. In the event of an unmap of a shared page table page, primary processor 110 may also invalidate data in its own cache 130 (e.g., using coherence control circuitry) in addition to the remote invalidate of data in cache 160 (e.g., via remote invalidate instruction 180).

Figure 3:
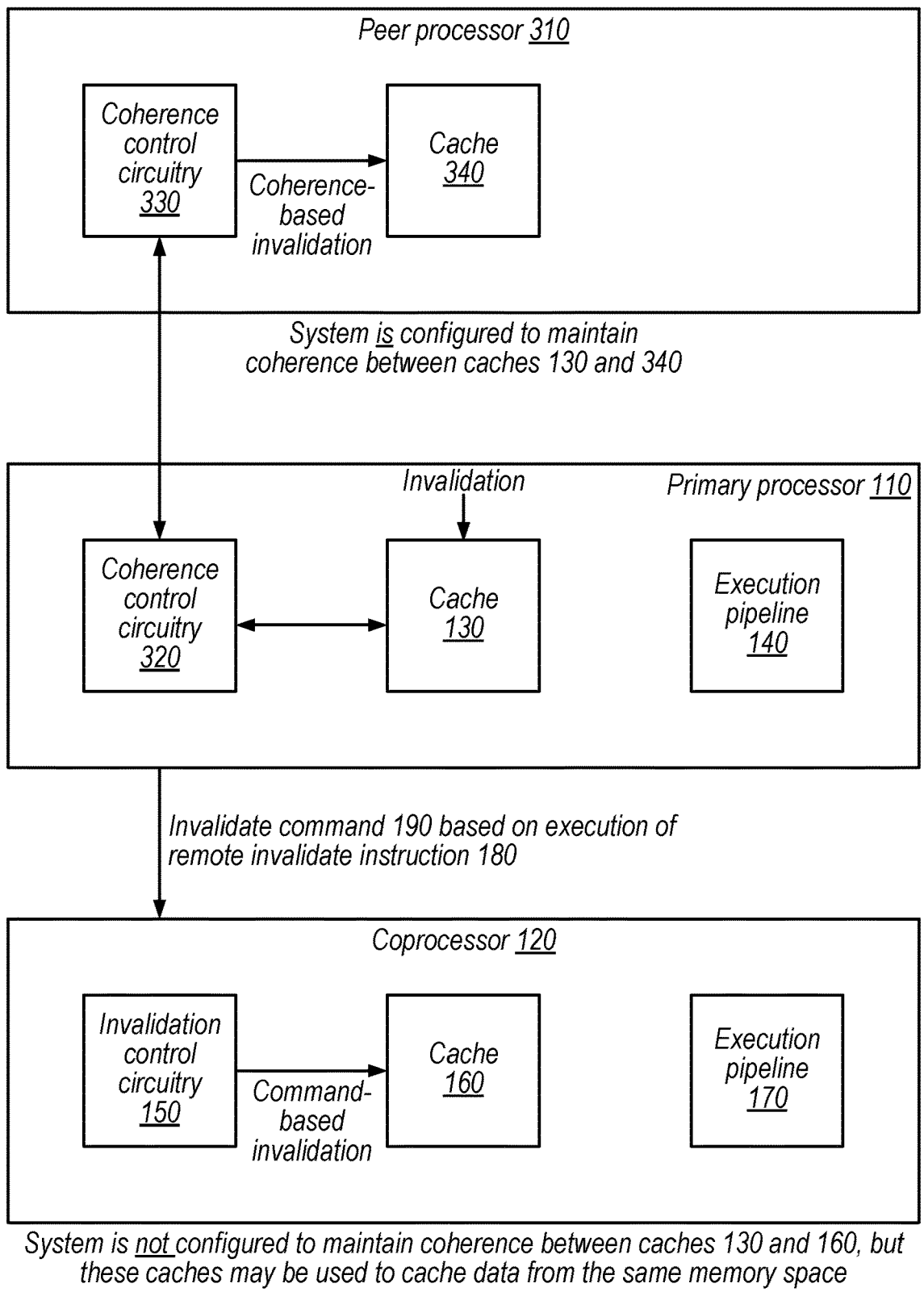
FIG. 3 is a block diagram illustrating an example system that supports both command-based remote cache invalidations and coherence-based cache invalidations, according to some embodiments.

FIG. 3 is a block diagram illustrating an example system that supports both command-based remote cache invalidations and coherence-based cache invalidations, according to some embodiments. In the illustrated example, the computing system includes primary processor 110, coprocessor 120, and peer processor 310. Peer processor 310 is a peer of primary processor 110 in one or more aspects. For example, processors 310 and 110 may be cores of the same multi-core processor or different processors in a processor cluster.

In the illustrated example, the system is configured to maintain coherence between caches 130 and 340. But the system is however not configured to maintain coherence between caches 130 and 160 (even though those caches may be used to cache data from the same memory space), other than remote invalidation techniques discussed herein. As shown, primary processor 110 may cause cache invalidations using different methods: primary processor 110 is configured to cause a command-based remote invalidation in cache 160 of non-peer coprocessor 120, and a coherence-based invalidation in cache 340 of peer processor 310.

Coherence control circuitry, in some embodiments, is configured to implement coherence protocols (e.g., MESI, MOSEI, write-invalidate, etc.) to maintain consistency among copies of data stored in multiple related different memory structures (including 130 and 340 in this example). Coherence control circuitry may perform various coherence-based operations such as cache invalidates, cache flushes, barrier enforcement, etc. to implement those coherence protocols. In the illustrated example, coherency control circuitry 320 and 330 is configured to maintain coherence between caches 130 and 160.

As an example of coherence-based invalidation, coherence control circuitry 330 may invalidate a line of cache 340 based on a write to a corresponding entry in cache 130 (which means that other caches need to invalidate their old copy). For example, circuitry 320 and 330 may implement snoop messages or a directory to track coherence. As another example, on a page unmap, processor 110 may use coherence control circuitry 320 and 330 to invalidate any corresponding lines in caches 130 and 340. Note that the two-sided arrow coupling coherence control circuitry 320 and 330 indicates that the coherence may be bidirectional.

Note that there may be various reasons that coherence control circuitry may not be implemented for cache 160 of coprocessor 120. For example, coherence control circuitry for a non-peer coprocessor may come at a high area and complexity cost to coprocessor 120. As another example, coherence control circuitry may simply not be desired or needed when primary processor 110 and coprocessor 120 are not peers.

Coprocessor 120, instead of performing a coherence-based invalidation as shown at peer processor 310, performs a command-based invalidation using invalidation control circuitry 150, e.g., as discussed above with reference to FIG. 1.

Figure 5:
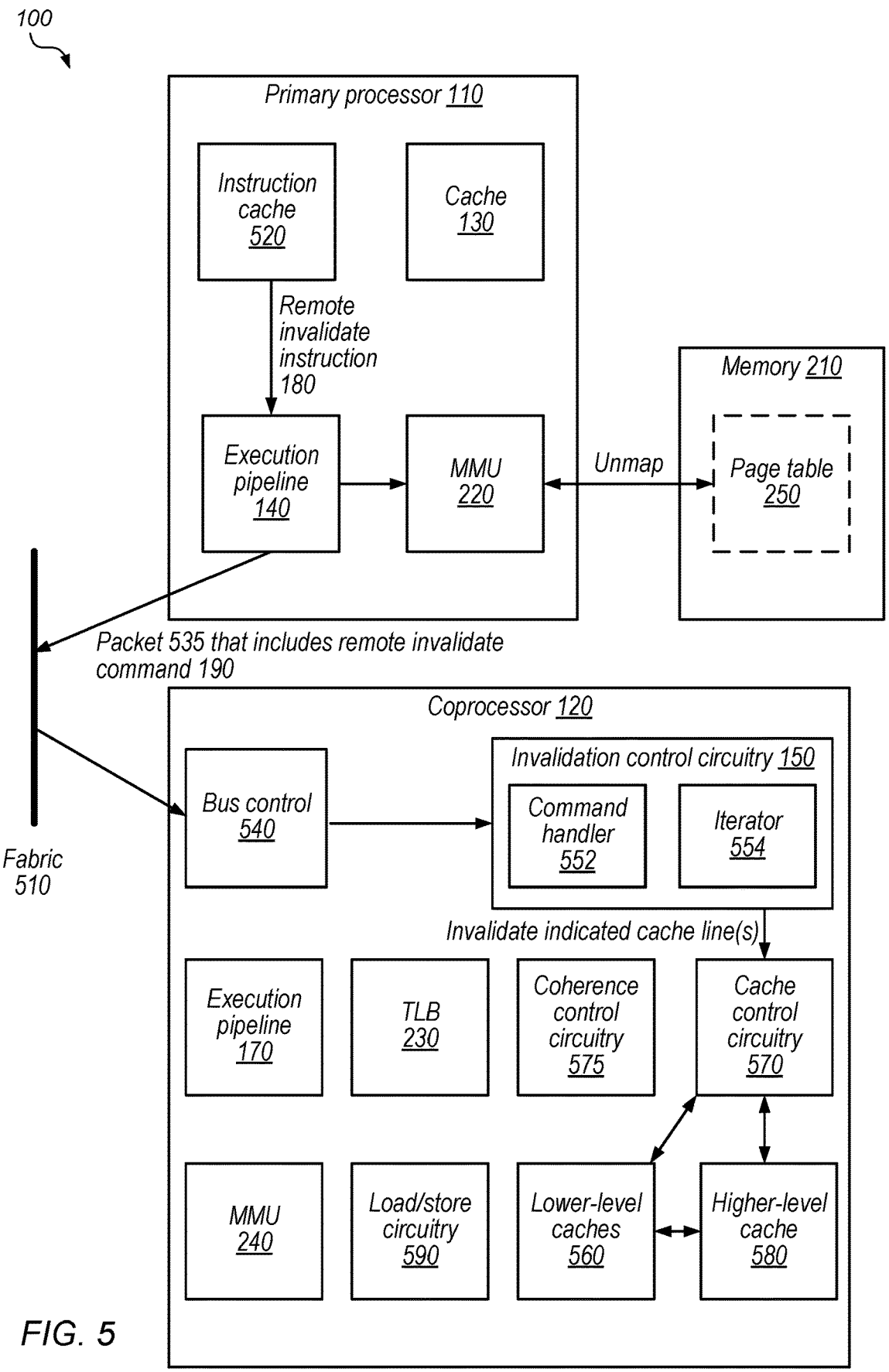
FIG. 5 is a block diagram illustrating a more detailed example of a primary processor and a coprocessor, according to some embodiments.

Note that coprocessor 120 may have internal coherence control circuitry configured to maintain coherence between internal caches of coprocessor 120, but not with caches present on non-peer processors, as is described in more detail with respect to FIG. 5. Conversely in some embodiments, processor 110 may send a remote invalidate command to peer processor 310 despite the presence of coherence control circuitry 320/330.

In some embodiments, processor 110 may send remote invalidations to other processors or coprocessors that are non-peers in various aspects. For example, the other processor may be in a different shareability domain. For example, consider primary processor 110 being in a first inner shareable domain, and coprocessor 120 being in a second, separate inner shareable domain. Processor 110 may send a remote invalidate command to cache 160 because cache 160 is not included in a the first shareability domain (of processor 110). Similarly, processor 110 may send remote invalidate commands to processors that are outside of certain protection domains.

The following figures show example fields included in example remote invalidate instructions and commands, according to some embodiments. Various fields described below may be used in conjunction with the techniques discussed above.

Figure 4A:
FIG. 4A is a diagram illustrating example fields of a remote invalidate instruction, according to some embodiments.

FIG. 4A is a diagram illustrating example fields of a remote invalidate instruction, according to some embodiments. The address field, in the illustrated embodiment, indicates the location in the cache (e.g., cache 160 of coprocessor 120) that is to be invalidated (e.g., by invalidation control circuitry 150). In some cases, cache 160 is physically tagged and the address includes all or a portion of a physical address corresponding to cache line(s) to be invalidated. In these embodiments, processor 110 may advantageously be able to generate a physical address for the invalidation because it manages page table 250, for example).

In other embodiments, cache 160 is virtually tagged and the address is all or a portion of a virtual address. In other embodiments, cache 160 is physically tagged and the address is all or a portion of a virtual address (although coprocessor 120 may use MMU 240 to determine which cache lines to invalidate). In some embodiments, the address field may include multiple addresses, which may be non-contiguous, for potential invalidation of different cache lines.

The granularity field, in the illustrated embodiment, describes the granularity of the invalidation. If the granularity indicates a cache line, then the invalidation may be for the cache line corresponding to the address specified in the address field, according to some embodiments. Otherwise if the granularity indicates multiple lines, the invalidation circuitry is configured invalidate up to N corresponding lines, where N is an integer greater than one. In some embodiments, granularity is a numeric value specifying the number of cache lines to potentially be invalidated. In other embodiments, the size is fixed (e.g., to correspond to the number of cache lines in a page).

Figure 4B:
FIG. 4B is a diagram illustrating example fields of a remote invalidate command, according to some embodiments.

FIG. 4B is a diagram illustrating example fields of a remote invalidate command, according to some embodiments. The processor ID field, in the illustrated embodiment, indicates (e.g., for routing by a fabric) which particular coprocessor of a group of coprocessors is to receive the invalidate command. The cache ID field, in the illustrated embodiment, identifies the particular cache (e.g., of a multi-level cache hierarchy at the specified coprocessor) at which the invalidate is to be performed.

As noted, a remote invalidate command may be generated in response to a remote invalidate instruction, and fields of the remote invalidate command may thus be inherited from their corresponding fields at the remote invalidate instruction in FIG. 4A. For example, in some embodiments the granularity fields are identical in functionality to those of the remote invalidate instructions. But in some embodiments these fields may differ from their analogues at instruction 180.

FIG. 5 is a block diagram illustrating a more detailed example of a primary processor and a coprocessor, according to some embodiments. This figure illustrates in more detail primary processor 110, coprocessor 120, and the remote invalidate example depicted in FIG. 1.

As shown, primary processor 110 further includes instruction cache circuitry 520 and is coupled to coprocessor 120 via a fabric 510. Also as shown, coprocessor 120 further includes bus control circuitry 540, coherence control circuitry 575, and load/store circuitry 590. Furthermore, invalidation control circuitry 150 includes command handler 552 and iterator 554.

Coprocessor 120, also as shown, has an example multi-level cache hierarchy that includes example cache control circuitry 570 configured to manage a lower-level cache 560 and a higher-level cache 580. As shown, lower-level cache 560 is closer to execution pipeline 170 relative to higher-level cache circuitry 580. In some examples multi-level cache hierarchy, coprocessor 120 includes multiple execution pipelines 170, multiple lower-level caches 560 each coupled to execution pipeline 170, and a single higher-level cache 580 shared between (and coherent with) the multiple lower-level caches 560. In some embodiments, the cache hierarchy of coprocessor 120 is a single-level cache hierarchy.

As shown, primary processor 110 stores remote invalidate instruction 180 in instruction cache 520 in response to an unmap. For example, software (e.g., an operating system) executing on processor 110 may generate, in conjunction with the unmap (via MMU 220) of a page at page table 250, an invalidate instruction 180 which is then stored in instruction cache 520. Additionally in some embodiments, processor 110 may also cause an invalidate of TLB 230 of coprocessor 120 in conjunction with the unmap, as will be discussed in more detail with respect to FIG. 6.

Execution pipeline 140 fetches and executes remote invalidate instruction 180 stored in instruction cache 520. As shown in FIG. 4A, instruction 180 may have fields (e.g., address and granularity) specifying the one or more lines of coprocessor cache to be invalidated. As noted, pipeline 140 may execute additional instructions relating to unmapping page table 250 and invalidating one or more entries of TLB 230.

As shown, primary processor 110 sends, in response to executing remote invalidation instruction 180, remote invalidate command 190 as a packet 535 via fabric 510. Similar to instruction 180, command 190/packet 535 may include information that further specifies the invalidate (e.g., address, granularity, coprocessor ID, cache ID), as described in FIG. 4B. Fabric 510, in some embodiments, is a fabric configured to handle communications between processor 110 and coprocessor 120 using the Advanced extensible Interface (AXI) protocol.

Coprocessor 120 receives packet 535 at bus control circuitry 540, which is configured to forward invalidate command 190 to invalidation control circuitry 150. Invalidation control circuitry 150 then triggers invalidation operations by cache control circuitry 570 based on command 190 (note that invalidation control circuitry 150 is included in cache control circuitry 570, in some embodiments). For example, command handler 552 and iterator 554 (in the case of multiple line invalidations) may use fields of command 190 to appropriately trigger the invalidation.

Command handler circuitry 552, in various embodiments, is configured to determine which cache lines to invalidate based on command 190. Command handler 552 may, in some embodiments, use the address field as a base address of the invalidation and the granularity field to determine the size of the cache region to be invalidated. In some embodiments, command handler receives a virtual address from command 190 and translates the address using TLB 230. But in other embodiments, command handler 552 receives a physical address in command 190 and bypasses translation (thus avoiding TLB lookup latency, MMU latency, or both). Command handler 552 may also determine (e.g., based on a granularity field) that the invalidate is for multiple cache lines and forward the invalidation to iterator 554.

Iterator 554, in various embodiments, is configured to generate multiple cache line invalidations based on remote invalidate command 190. If invalidate command 190 indicates (e.g., via a granularity field) an invalidation of multiple lines, iterator 554 causes control circuitry 150 to issue multiple cache line invalidation commands to cache control circuitry 570 based on the indication. Iterator 554 may issue a predefined number of invalidates based on granularity of command 190 (e.g., a predefined cache block size), or a number of invalidates specified by a numeric field of command 190. But in cases where command 190 specifies a single line to be invalidated, invalidation control circuitry 150 may bypass iterator 554 and issue a single cache invalidation command to cache control circuitry 570 at the specified address. Using iterator 554 may be advantageous relative to sending an equivalent number of remote invalidate commands via fabric 510, e.g., to reduce bandwidth on fabric 510.

Cache control circuitry 570, in various embodiments, is configured to perform the cache invalidations at one or more cache levels of coprocessor 120 based on issued commands from invalidation control circuitry 150. For example, cache control circuitry 570 may check tags of cache lines in higher-level cache 580 and invalidate any lines whose tags match the address of the remote invalidate command.

Generally, remote invalidation in one cache may cause invalidations in other caches. For example, coherence control circuitry may enforce coherence among multiple lower-level caches 560 and may perform invalidation operations based on higher-level cache 580 as a coherence point. Coherence control circuitry may use a directory-based or snoop-based architecture, for example.

Load/store circuitry (LSU) 590, in various embodiments, is configured to manage memory operations at various memory circuits. For example, circuitry 590 may receive load requests and access one or more of cache 560, cache 580, and external memory circuitry (e.g., memory 210) depending on whether the requested data is cached or not. In some embodiments, invalidation control circuitry 150 is configured to utilize load/store circuitry 590 to perform the disclosed invalidations. For example, invalidation control circuitry 150 may issue invalidate commands into a store queue of load/store circuitry 590. Note that load/store circuitry 590 may be configured to enforce ordering among memory operations (e.g., using CAM operations between a load queue and store queue), but may not enforce ordering for invalidate operations from invalidation control circuitry 150. Load/store circuitry 590 may, however, adjust counters relating to barrier operations, for example, based on invalidation operations from invalidation control circuitry 150. Thus, younger barrier operations may wait until older invalidation operations from invalidation control circuitry 150 complete. Note that use of LSU 590 by invalidation control circuitry 150 does not execute instructions on the pipeline 170, rather, invalidate commands to the LSU 590 are directly issued by circuitry 150 to LSU 590 in the illustrated example.

In some cases, load/store circuitry 590 is configured to reduce or avoid conflicts relating to cache lines that are to be invalidated. In particular, load/store circuitry may enforce a particular ordering of memory operations specified by a given synchronization barrier command, as will be described in more detail with respect to FIG. 6. To enforce synchronization barriers, load/store circuitry 590 may be configured to various operations such as blocking various pending operations (e.g., using a hardware counter), rearranging the order of operations to enforce a particular ordering (e.g., using comparison circuitry), etc.

Figure 6:
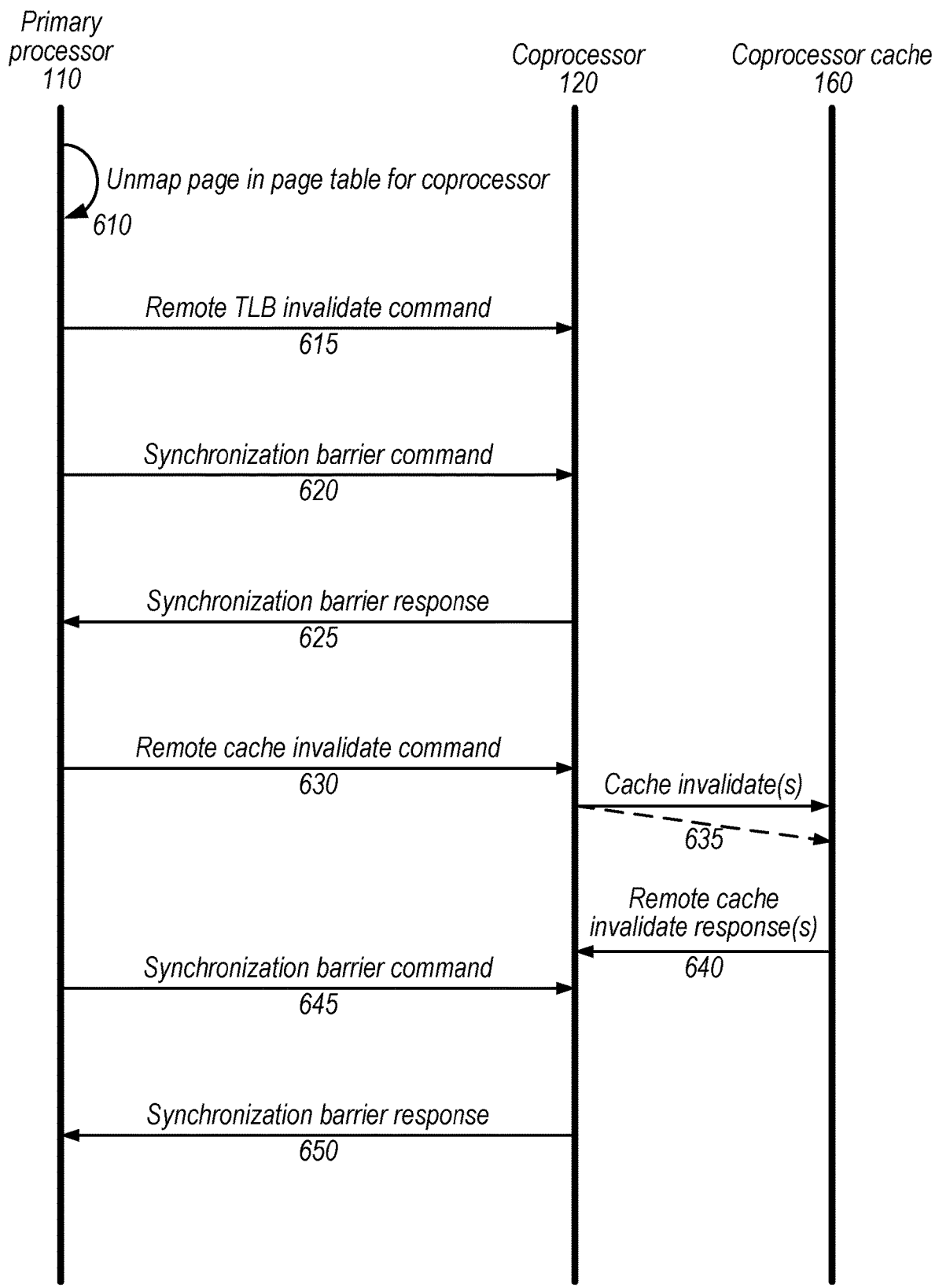
FIG. 6 is a communications diagram illustrating example communication between a primary processor, a coprocessor, and a coprocessor cache during a remote cache invalidate, according to some embodiments.

FIG. 6 is a communications diagram illustrating example communication between a primary processor, a coprocessor, and a coprocessor cache during a remote cache invalidate, according to some embodiments. In the illustrated embodiment, primary processor 110 initiates an invalidation of data in coprocessor cache 160 of coprocessor 120 based on the execution of a remote cache invalidate instruction 180.

As will be discussed below, coprocessor 120 may use synchronization barrier commands to enforce an ordering of operations at load/store circuitry 590 and avoid potential deadlock scenarios. In some embodiments, primary processor 110 executes a memory-related barrier instruction (e.g., ARM DSB or DMB instructions) and sends a corresponding synchronization barrier command to coprocessor 120. Then, coprocessor 120 routes these synchronization barrier commands to load/store circuitry 590, which enforces the indicated synchronization. Moreover, synchronization barriers may provide correctness of data in various caches, including caches that may not have been directly invalidated by a remote cache invalidate command.

As shown, the example remote cache invalidate is triggered by processor 110 unmapping a page for coprocessor 120 at 610. Processor 110 then sends a remote TLB invalidate command 615 to coprocessor 120. In some cases, command 615 is for any matching TLB entries that include translations in the unmapped page. Similar to cache invalidate command 190, processor 110 may perform remote TLB invalidation in response to executing an instruction specifying the TLB invalidation. In some embodiments, processor 110 sends command 615 to coprocessor 120 in a fabric message or packet. Once TLB invalidation is completed at 620, coprocessor 120 may return an acknowledgement to primary processor 110 indicating the completion.

Primary processor 110 sends a synchronization barrier command 620 that ensures the TLB invalidation is completed prior to the completion of barrier command 620 (and the execution any operation subsequent to barrier command 620). Once the synchronization barrier is complete (signaling that the TLB invalidation is also complete), the coprocessor returns a corresponding synchronization barrier response 625 to processor 110.

Then, primary processor 110 sends a remote cache invalidate command 630 (e.g., command 190) to coprocessor 120, which proceeds to issue invalidate command(s) (e.g., via invalidation control circuitry 150) to cache 160. In some embodiments, processor 110 sends, via a fabric, a packet to coprocessor 120 that includes the invalidate command.

In some cases, the cache invalidate command may specify multiple cache lines for invalidation (e.g., via an opcode or a granularity field). Accordingly at invalidates 635, coprocessor 120 may issue (e.g., using iterator 554) multiple remote invalidates (as indicated by the dashed line) to cache 160 based on the command's indication that the invalidation is for multiple cache lines. Further note that coprocessor 120 may cause (e.g., via coherence control mechanisms) invalidation for multiple cache levels. Once coprocessor cache 160 invalidates any matching data cache lines, coprocessor cache 160 sends a remote cache invalidate response 640 to coprocessor 120.

As shown, processor 110 then sends a second synchronization barrier command 645. Coprocessor 120 returns a synchronization barrier response 650, which ensures that the invalidation (and any related computation pertaining to the invalidation) is completed before barrier command 645 (and any subsequent command issued after 645) is completed.

When executing the illustrated barrier operations, the system may avoid deadlock scenarios. Synchronization barrier 620, in some embodiments, ensures that no outstanding loads/store/prefetches are outstanding, to addresses being invalidated, when the remote cache invalidate command occurs. There may, however, be eviction traffic to those addresses between cache levels or from a cache level and a bus interface. To avoid deadlock, the system may ensure that no dependency forms between bus traffic (including eviction traffic on the bus) and remote cache invalidate response(s) 640. (Although certain stalls may be acceptable).

For example, if there is an outstanding eviction write to memory when a cache invalidate 635 is received for a given address, the system may respond immediately with the corresponding remote cache invalidate response 640 (rather than waiting for the eviction write and forming a dependency). This may avoid a dependency deadlock.

Synchronization barrier 645 may ensure proper ordering of such eviction writes. For example, when the synchronization barrier command 645 is received, the coprocessor 120 may wait for the eviction write to complete before responding with synchronization barrier response 650. Note that, in some embodiments, the system is designed to tolerate dependencies on bus traffic for barriers 620 and 645. For example, the system may allow non-barriers to bypass barriers and may provide sufficient buffering for the maximum number of outstanding barriers producible by the system.

Therefore, in various embodiments, the system may respond to cache invalidate commands before outstanding traffic to the same address is complete to avoid deadlocks, but a barrier command (such as barrier command 645) may ensure completion of that traffic.

Example Method

Figure 7:
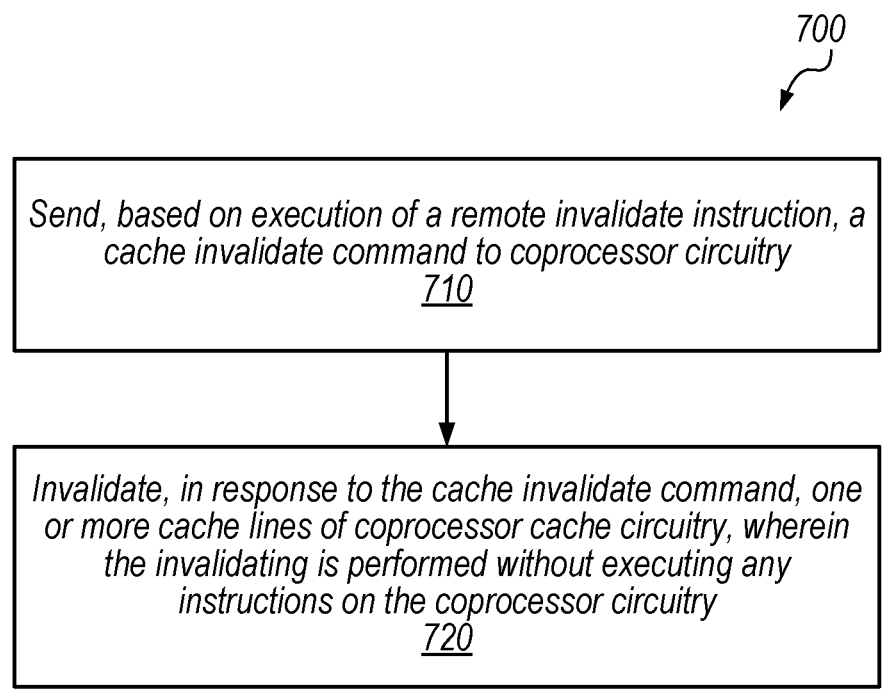
FIG. 7 is a flow diagram illustrating an example method for a remote cache invalidation, according to some embodiments.

FIG. 7 is a flow diagram illustrating an example method for performing a remote cache invalidate, according to some embodiments. Method 700 shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, processor circuitry (e.g., primary processor 110) sends, based on execution of a remote invalidate instruction (e.g., instruction 180), a cache invalidate command (e.g., command 190) to coprocessor circuitry (e.g., coprocessor 120).

At 720, in the illustrated embodiment, coprocessor circuitry invalidates (e.g., using invalidation control circuitry 150), in response to the cache invalidate command, one or more cache lines of coprocessor cache circuitry (e.g., cache 160), where the invalidating is performed without executing (e.g., in execution pipeline 170) any instructions on the coprocessor circuitry.

In some embodiments, the cache invalidate command is included in a packet transmitted on a communication fabric, where the packet includes at least information that specifies one or more addresses to invalidate and an identifier of the coprocessor circuitry. In some embodiments, the invalidation of the one or more cache lines in the coprocessor cache circuitry includes invalidation of multiple cache lines in the coprocessor cache circuitry based on a single cache invalidate command that indicates to invalidate multiple cache lines of the coprocessor cache circuitry. In some embodiments, the coprocessor circuitry supports instructions with virtual addresses and is configured to translate virtual addresses to physical addresses, the coprocessor cache circuitry is tagged using physical addresses, and the cache invalidate command indicates a physical address to be invalidated.

In some embodiments, the primary processor circuitry is configured to map memory pages for the coprocessor circuitry. The primary processor circuitry may unmap a page that was mapped for the coprocessor circuitry, where the sending is performed based on the unmap. In some embodiments, coherence control circuitry on the primary processor is configured to maintain coherence between other cache circuitry on another processor and the primary processor cache circuitry, including to, based on the unmap, invalidate one or more cache lines of the other cache circuitry to maintain coherence. The coherence control circuitry may not be configured to maintain coherence, for the unmap, between the primary processor cache circuitry and the coprocessor cache circuitry.

In some embodiments, the coprocessor circuitry further includes translation lookaside buffer circuitry that implements entries configured to store translations from a first address space to a second address space. The primary processor circuitry may send, based on the unmap, a translation lookaside buffer invalidate command to the coprocessor circuitry that invalidates one or more corresponding entries in the translation lookaside buffer circuitry. In some embodiments, the primary processor further sends a first barrier command between the translation lookaside buffer invalidate command and the cache invalidate command and a second barrier command after the cache invalidate command.

In some embodiments, the primary processor circuitry includes one or more caches that are included in one or more of the multiple shareability domains, including the primary processor cache circuitry, and the coprocessor cache circuitry is not included in any shareability domain in which any cache of the primary processor circuitry is included.

In some embodiments, the coprocessor circuitry further comprises coprocessor cache coherence circuitry and lower-level cache circuitry, where the lower-level cache circuitry is closer to an execution pipeline of the coprocessor circuitry than the coprocessor cache circuitry in a cache hierarchy. The coprocessor cache coherence circuitry may, in response to the invalidation at the coprocessor cache circuitry, invalidate one or more corresponding cache lines in the lower-level cache circuitry.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 8:
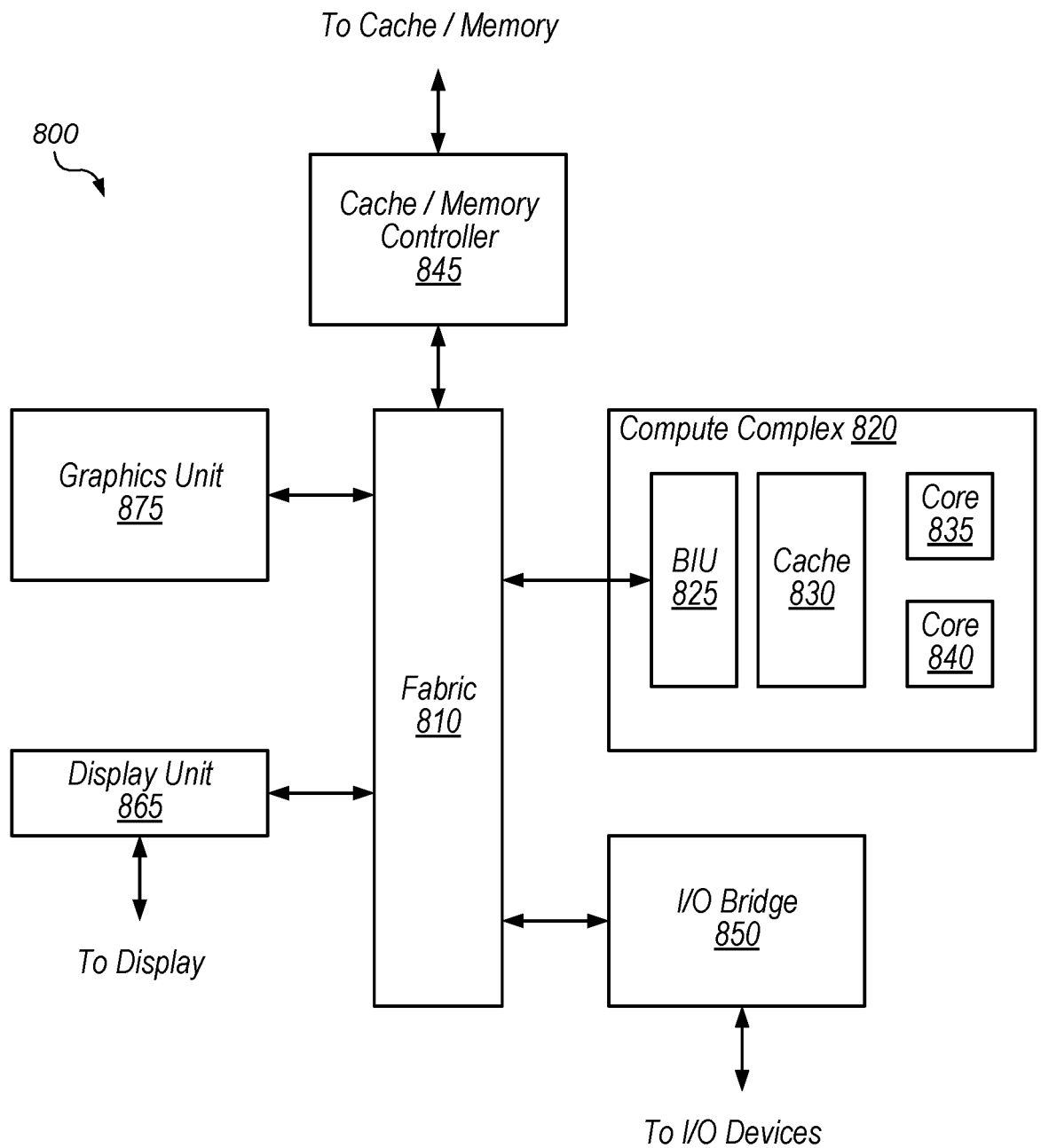
FIG. 8 is a block diagram illustrating an example computing device, according to some embodiments.

Referring now to FIG. 8, a block diagram illustrating an example embodiment of a device 800 is shown. In some embodiments, device 800 may implement the functionality of system 100, including processor 110 and coprocessor 120. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
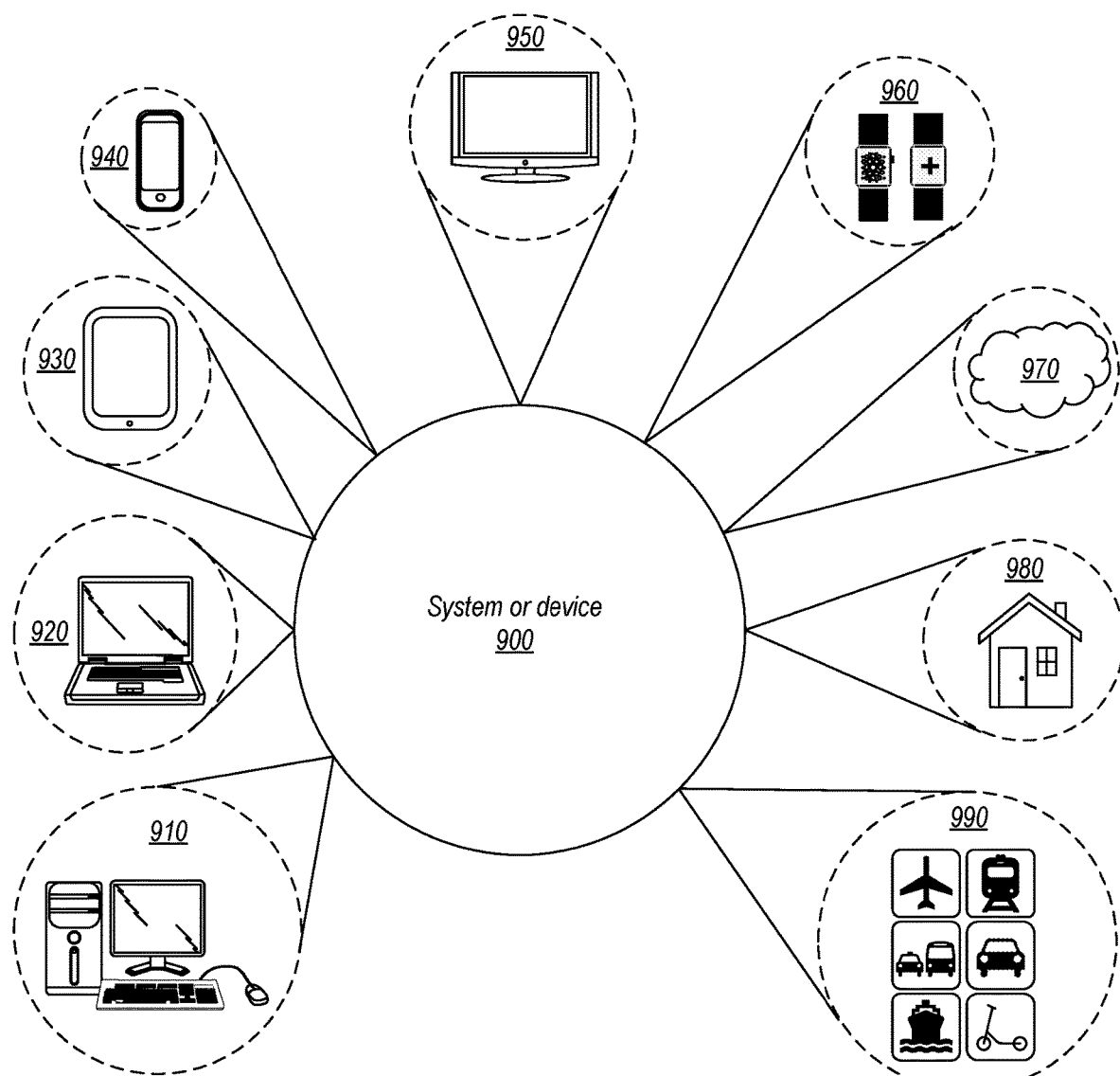
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
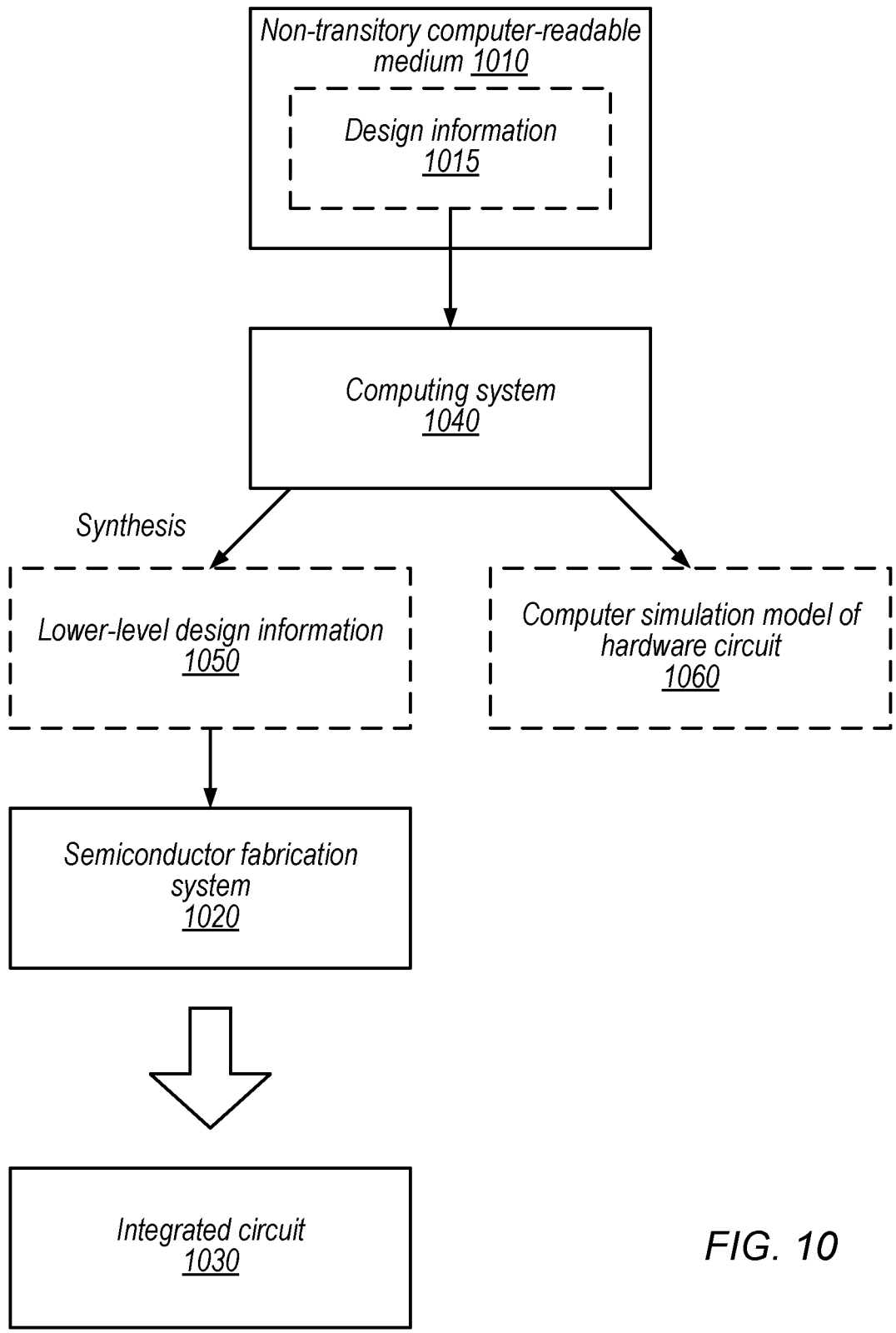
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1, 2, and 5. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
coprocessor circuitry that includes:
    coprocessor cache circuitry; and
    cache invalidation control circuitry;
primary processor circuitry that includes:
    an execution pipeline; and
    primary processor cache circuitry;
wherein:
    the primary processor circuitry is configured to:
        map memory pages for the coprocessor circuitry;
        unmap a page that was mapped for the coprocessor circuitry; and
        based on the unmap and execution of a remote invalidate instruction by the execution pipeline, send a cache invalidate command to the coprocessor circuitry; and
    the cache invalidation control circuitry is configured to, in response to the cache invalidate command, invalidate one or more cache lines in the coprocessor cache circuitry, where the cache invalidation control circuitry is configured to perform the invalidation without executing any instructions on the coprocessor circuitry.

2. The apparatus of claim 1, further comprising:
coherence control circuitry; and
other processor circuitry that includes other cache circuitry;
wherein:
    the coherence control circuitry is configured to maintain coherence between the other cache circuitry and the primary processor cache circuitry, including to, based on the unmap, invalidate one or more cache lines of the other cache circuitry to maintain coherence; and
    the coherence control circuitry is not configured to maintain coherence, for the unmap, between the primary processor cache circuitry and the coprocessor cache circuitry.

3. The apparatus of claim 1, wherein:
the coprocessor circuitry further includes translation lookaside buffer circuitry that implements entries configured to store translations from a first address space to a second address space; and
the primary processor circuitry is further configured to, based on the unmap, send a translation lookaside buffer invalidate command to the coprocessor circuitry that invalidates one or more corresponding entries in the translation lookaside buffer circuitry.

4. The apparatus of claim 3, wherein:
the primary processor circuitry is further configured to send:
    a first barrier command between the translation lookaside buffer invalidate command and the cache invalidate command; and
    a second barrier command after the cache invalidate command.

5. The apparatus of claim 4, wherein:
the coprocessor circuitry is further configured to respond to the cache invalidate command before an eviction for an address that matches the cache invalidate command is complete; and
the second barrier command ensures completion of the eviction.

6. The apparatus of claim 1, wherein:
the coprocessor circuitry supports instructions with virtual addresses and is configured to translate virtual addresses to physical addresses;
the coprocessor cache circuitry is tagged using physical addresses; and
the cache invalidate command indicates a physical address to be invalidated.

7. The apparatus of claim 1, wherein:
the invalidation of the one or more cache lines in the coprocessor cache circuitry includes invalidation of multiple cache lines in the coprocessor cache circuitry based on a single cache invalidate command that indicates to invalidate multiple cache lines of the coprocessor cache circuitry.

8. The apparatus of claim 1, wherein:
the apparatus supports multiple shareability domains;
the primary processor circuitry includes one or more caches that are included in one or more of the multiple shareability domains, including the primary processor cache circuitry; and
the coprocessor cache circuitry is not included in any shareability domain in which any cache of the primary processor circuitry is included.

9. The apparatus of claim 1, wherein:
the cache invalidate command is included in a packet transmitted on a communication fabric, wherein the packet includes at least the following:
information that specifies one or more addresses to invalidate; and
an identifier of the coprocessor circuitry.

10. The apparatus of claim 1, wherein:
the coprocessor circuitry further comprises:
lower-level cache circuitry, where the lower-level cache circuitry is closer to an execution pipeline of the coprocessor circuitry than the coprocessor cache circuitry in a cache hierarchy; and
coprocessor cache coherence circuitry; and
the coprocessor cache coherence circuitry is configured to, in response to the invalidation at the coprocessor cache circuitry, invalidate one or more corresponding cache lines in the lower-level cache circuitry.

11. The apparatus of claim 1, wherein the apparatus is a computing device that further includes:
a display; and
network interface circuitry.

12. A method, comprising:
mapping, by a processor, memory pages for a coprocessor;
unmapping, by the processor, a page that was mapped for the coprocessor;
sending, by the processor based on the unmapping and execution of a remote invalidate instruction, a cache invalidate command to coprocessor; and
invalidating, by the coprocessor in response to the cache invalidate command, one or more cache lines of coprocessor cache, wherein the invalidating is performed without executing any instructions on the coprocessor.

13. The method of claim 12, further comprising:
storing, implementing, by the coprocessor, by a translation lookaside buffer of the coprocessor, translations from a first address space to a second address space; and
sending, by the coprocessor based on the unmap, a translation lookaside buffer invalidate command that invalidates one or more corresponding entries in the translation lookaside buffer.

14. The method of claim 13, further comprising:
sending, by the processor to the coprocessor:
a first barrier command between the translation lookaside buffer invalidate command and the cache invalidate command; and
a second barrier command after the cache invalidate command.

15. A non-transitory computer-readable medium having instructions of a hardware description programming language stored thereon that, when processed by a computing system, program the computing system to generate a computer simulation model, wherein the model represents a hardware circuit that includes:
coprocessor circuitry that includes:
coprocessor cache circuitry; and
cache invalidation control circuitry;
primary processor circuitry that includes:
an execution pipeline; and
primary processor cache circuitry;
wherein:
the primary processor circuitry is configured to:
map memory pages for the coprocessor circuitry;
unmap a page that was mapped for the coprocessor circuitry; and
based on the unmap and execution of a remote invalidate instruction by the execution pipeline, send a cache invalidate command to the coprocessor circuitry; and
the cache invalidation control circuitry is configured to, in response to the cache invalidate command, invalidate one or more cache lines in the coprocessor cache circuitry, where the cache invalidation control circuitry is configured to perform the invalidation without executing any instructions on the coprocessor circuitry.

16. The non-transitory computer-readable medium of claim 15, wherein the hardware circuit further includes:
coherence control circuitry; and
other processor circuitry that includes other cache circuitry;
wherein:
the coherence control circuitry is configured to maintain coherence between the other cache circuitry and the primary processor cache circuitry, including to, based on the unmap, invalidate one or more cache lines of the other cache circuitry to maintain coherence; and
the coherence control circuitry is not configured to maintain coherence, for the unmap, between the primary processor cache circuitry and the coprocessor cache circuitry.

17. The non-transitory computer-readable medium of claim 15, wherein:
the hardware circuit supports multiple shareability domains;
the primary processor circuitry includes one or more caches that are included in one or more of the multiple shareability domains, including the primary processor cache circuitry; and
the coprocessor cache circuitry is not included in any shareability domain in which any cache of the primary processor circuitry is included.

18. The non-transitory computer-readable medium of claim 15, wherein:
    the coprocessor circuitry further comprises:
        lower-level cache circuitry, where the lower-level cache circuitry is closer to an execution pipeline of the coprocessor circuitry than the coprocessor cache circuitry in a cache hierarchy; and
        coprocessor cache coherence circuitry; and
    the coprocessor cache coherence circuitry is configured to, in response to the invalidation at the coprocessor cache circuitry, invalidate one or more corresponding cache lines in the lower-level cache circuitry.

* * * * *